US008438082B2

(12) United States Patent  (10) Patent No.: US 8,438,082 B2
Sawada et al.  (45) Date of Patent: May 7, 2013

(54) CONSUMABLE SUPPLY MANAGEMENT SYSTEM, CONSUMABLE SUPPLY MANAGEMENT METHOD, AND CONSUMABLE SUPPLY MANAGEMENT PROGRAM

(75) Inventors: Masaichi Sawada, Tokyo (JP); Shigetoshi Hatanaka, Kawaguchi (JP)

(73) Assignee: Ricoh Company, Ltd., Tokyo (JP)

( * ) Notice: Subject to any disclaimer, the term of this patent is extended or adjusted under 35 U.S.C. 154(b) by 459 days.

(21) Appl. No.: 12/546,409

(22) Filed: Aug. 24, 2009

(65) Prior Publication Data

US 2010/0049636 A1  Feb. 25, 2010

(30) Foreign Application Priority Data

Aug. 25, 2008  (JP) ................................ 2008-215776

(51) Int. Cl.
    *G06Q 10/00*  (2006.01)
(52) U.S. Cl.
    USPC .......................................... 705/28; 702/188
(58) Field of Classification Search .................. 705/201, 705/202, 205, 412, 22, 36, 44; 709/22, 36, 709/44, 201, 202, 205, 412
    See application file for complete search history.

(56) References Cited

U.S. PATENT DOCUMENTS

| 5,809,479 | A  | * | 9/1998  | Martin et al.  ................ | 705/7.24 |
| 7,844,659 | B2 | * | 11/2010 | Baeuerle et al.  ............. | 709/202 |
| 2003/0229691 | A1 | * | 12/2003 | Ishimoto  ...................... | 709/223 |
| 2004/0220779 | A1 | * | 11/2004 | Fukao  .......................... | 702/188 |
| 2008/0071626 | A1 | * | 3/2008  | Hill  .............................. | 705/22 |

FOREIGN PATENT DOCUMENTS

| JP | 2003-345560 | 12/2003 |
| JP | 2004-12518  | 1/2004 |
| JP | 3730135     | 10/2005 |
| JP | 2005-321546 | 11/2005 |
| JP | 2006-221285 | 8/2006 |
| JP | 2006-292830 | 10/2006 |
| JP | 2007-128446 | 5/2007 |
| JP | 2007-293877 | 11/2007 |
| JP | 2007-310871 | 11/2007 |
| JP | 2008-65128  | 3/2008 |
| JP | 2009-20351  | 1/2009 |

OTHER PUBLICATIONS

Hau L. Lee & Corey Billington, "Inventory: Pitfalls and Opportunities", Sloan Management Review, Spring 1992 (Attached).*

* cited by examiner

*Primary Examiner* — Matthew Gart
*Assistant Examiner* — Rokib Masud
(74) *Attorney, Agent, or Firm* — Oblon, Spivak, McClelland, Maier & Neustadt, L.L.P.

(57) ABSTRACT

A consumable supply management system, connected to an image forming apparatus storing an apparatus identification data and using a consumable supply, includes a system controller and a management information storage. The management information storage stores management information including the apparatus identification data and a delivery-completed flag. The system controller includes a remaining amount information recording unit, a search unit, a delivery instruction unit, and an information clearing unit. The remaining amount information recording unit stores the management information to the management information storage when notification of remaining amount of the consumable supply is received. The search unit searches management information. The delivery instruction unit determines to deliver or suspend a delivery of a spare consumable supply in view of information clearing status of the management information and status of the delivery-completed flag. When consumable supply replacement information is received, the information clearing unit clears the management information.

8 Claims, 6 Drawing Sheets

CONSUMABLE SUPPLY MANAGEMENT SYSTEM, CONSUMABLE SUPPLY MANAGEMENT METHOD, AND CONSUMABLE SUPPLY MANAGEMENT PROGRAM

CROSS-REFERENCE TO RELATED APPLICATIONS

This application claims priority to Japanese Patent Application No. 2008-215776, filed on Aug. 25, 2008 in the Japan Patent Office, which is hereby incorporated by reference herein in its entirety.

BACKGROUND OF THE INVENTION

1. Field of the Invention

The present invention relates to a consumable supply management system, a consumable supply management method, and a consumable supply management program for managing consumable supply used for image forming apparatuses such as printers, copiers, or the like.

2. Description of the Background Art

Image forming apparatuses (e.g., printers, copiers, facsimile machines) typically need consumable supplies (e.g., sheets, toner) used for image forming operations. Accordingly, if such consumable supplies are completely consumed (referred to as "consumable supply end"), the image forming apparatuses cannot continue image forming operations, which is inconvenient for a user.

In view of such consumable supply end condition, a client (or user) may need to stock some spare consumable supplies, and place an order when it is determined that consumable supply end is to occur in the near future. Typically, consumable supplies are delivered to a client upon such order being placed, but such delivery process needs a given time including transportation time such as several days. Among various consumable supplies, toner may need more time to be delivered than other supplies such as sheets of recording media such as paper or the like.

Accordingly, one method has been devised to detect a toner-near-end condition before a toner end condition occurs, and then place an order for toner delivery when the toner-near-end condition is detected. Further, another method has been devised to detect and report a toner-near-end condition to a toner supply management server so that the toner supply management server is used to manage toner inventory at a client.

However, if the toner end condition occurs so quickly after detecting the toner-near-end condition that toner cannot be delivered to the client in time to continue image forming operations without interruption. In such a case, the client cannot use the image forming apparatus until a new toner bottle is delivered.

In view of such situation, several methods have been devised to detect toner consumption amount more accurately. For example, JP-2003-39789-A discloses a method of reading charge quantities of an electrostatic latent image formed on a photoconductor drum using an electronic sensor, and predicting toner consumption amount based on the charge quantities. Further, JP-2003-39789-A discusses a method of detecting a change in a toner remaining amount by detecting a change of electrostatic capacitance of the toner, and a method of detecting a toner remaining amount by counting the number of dots used for a latent image forming operation. Then, based on the detected remaining toner amount, a toner delivery order is placed.

By contrast, JP-2004-37743-A discloses a system to detect toner consumption amount by measuring toner flow amount. In JP-2004-37743-A, toner is supplied from a toner container (e.g., large capacity container) to an image forming engine using a toner supply unit having a flow meter, which detects toner flow amount. Accordingly, by detecting the toner flow amount using the flow meter, toner consumption amount for a given period of time can be detected.

However, the toner-near-end condition may be falsely detected even if toner still exists in a toner container in an amount sufficient for image forming operations.

For example, in JP-2003-39789-A, the number of pixels composing an electrostatic latent image on a surface of photoconductor drum is counted. Accordingly, if the photoconductor drum degrades over time, a tone adhering amount on the photoconductor drum may change, by which toner consumption amount may not be computed correctly. Further, the tone adhering amount during development may fluctuate due to environmental conditions such as temperature and/or humidity, making correct computation of toner consumption amount hard to attain.

Further, in JP-2004-37743-A, the flow meter measures toner flow amount. However, because toner amount flowing in a toner supply route may be too small, toner consumption amount detected by the flow meter may not match correctly an actual toner consumption amount from the toner container. Consequently, the toner consumption amount predicted by such method may deviate significantly from the actual toner consumption amount from the toner container.

Under the above-described system, a toner-near-end condition may not be correctly detected, and thereby a new toner bottle may be delivered unnecessarily to the client based on an incorrect detection of toner-near-end condition. For example, at a given time, a toner-near-end condition may be detected by a toner management system, which manages toner container delivery, and then the toner management system delivers a new toner container to the client. However, such toner-near-end condition may be canceled soon after. For example, at the toner-near-end condition, the client may remove and shake the toner container, and re-install the same toner container in the image forming apparatus. In such a case, the toner-near-end condition can be canceled and an image forming operation can be further continued. Then, another toner-near-end condition is detected by the toner management system again, and then such another toner-near-end condition is canceled again soon after. When such another toner-near-end condition is detected, the toner management system delivers another new toner container again to the client. Accordingly, if a toner delivery order is automatically placed whenever the toner-near-end condition is detected by the toner management system, consumable supplies such as toner container may be delivered to and stocked at a client's location, exceeding a necessary stock level. Such overstocked condition is not convenient for the client because over-stocked consumable supplies require a larger stock space. Further, such over-stocked condition is not convenient for the client because if the client changes the image forming apparatus from one model to another model, such overstocked consumable supplies for one model may not be usable in the new model.

SUMMARY

In one aspect of the present invention, a consumable supply management system, connected to an image forming apparatus including a memory storing apparatus identification data assigned to the image forming apparatus and a consumable supply used in the image forming apparatus is devised. The consumable supply management system includes a system controller and a management information storage. The system controller exchanges information with the image forming apparatus. The management information storage stores management information for the consumable supply. The management information includes the apparatus identification data and a delivery-completed flag indicating a delivery-completed status of a spare consumable supply. The management information storage is controlled by the system controller. The system controller includes a remaining amount information recording unit, a search unit, a delivery instruction unit, and an information clearing unit (217). The remaining amount information recording unit stores the management information to the management information storage when a notification of remaining amount of the consumable supply is received from the image forming apparatus, in which the notification of remaining amount of the consumable supply includes the apparatus identification data for the management information. The search unit conducts a search process for searching other management information including the apparatus identification data included in the management information stored in the management information storage. The delivery instruction unit determines deliver of a spare consumable supply or to suspend delivery of a spare consumable supply. The information clearing unit conducts an information clearing process to clear information. The delivery instruction unit issues a delivery instruction for a spare consumable supply, and stores a delivery-completed flag in the management information storage as one piece of data of the management information 1) if other management information, which has not been subjected to an information clearing process, is not retrieved by the search process or 2) if other management information, which has not been subjected to an information clearing process and does not include a delivery-completed flag, is retrieved by the search process. The delivery instruction unit suspends a delivery instruction of a spare consumable supply, 3) if other management information, which has not been subjected to an information clearing process and has a delivery-completed flag, is retrieved by the search process. When consumable supply replacement information, indicating a detection of replacement of the consumable supply in the image forming apparatus, is received from the image forming apparatus, the information clearing unit conducts an information clearing process to the management information including the apparatus identification data included in the consumable supply replacement information.

In another aspect of the present invention, a method of managing consumable supply using a consumable supply management system, connected to an image forming apparatus including a memory storing apparatus identification data assigned to the image forming apparatus and a consumable supply used in the image forming apparatus, is devised. The consumable supply management system includes a system controller and a management information storage. The system controller exchanges information with the image forming apparatus. The management information storage stores management information for the consumable supply. The management information includes the apparatus identification data and a delivery-completed flag indicating a delivery-completed status of a spare consumable supply. The management information storage is controlled by the system controller. The method includes the steps of storing, searching, determining, and clearing. The storing step stores the management information to the management information storage when notification of remaining amount of the consumable supply is received from the image forming apparatus, in which the notification of remaining amount of the consumable supply includes the apparatus identification data for the management information. The searching step searches other management information including the apparatus identification data included in the management information stored in the management information storage. The determining step determines to deliver a spare consumable supply or to suspend a delivery of a spare consumable supply. In the determining step, issuing a delivery instruction of a spare consumable supply and storing a delivery-completed flag in the management information storage as one piece of data of the management information, 1) if other management information, which has not been subjected to an information clearing process, is not retrieved by the searching step, or 2) if other management information, which has not been subjected to an information clearing process and does not include a delivery-completed flag, is retrieved by the searching step. In the determining step, suspending a delivery instruction of a spare consumable supply, 3) if other management information, which has not been subjected to an information clearing process and has a delivery-completed flag, is retrieved by the searching step. The clearing step clears the management information including the apparatus identification data included in consumable supply replacement information when the consumable supply replacement information, indicating detection of replacement of the consumable supply in the image forming apparatus, is received from the image forming apparatus.

In another aspect of the present invention, a computer program including computer-readable instructions that, when executed by a computer, instruct a controller to execute a method of managing consumable supply using a consumable supply management system, connected to an image forming apparatus including a memory storing apparatus identification data assigned to the image forming apparatus and a consumable supply used in the image forming apparatus, is prepared. The consumable supply management system includes a system controller and a management information storage. The system controller exchanges information with the image forming apparatus. The management information storage stores management information for the consumable supply. The management information includes the apparatus identification data and a delivery-completed flag indicating a delivery-completed status of a spare consumable supply. The management information storage is controlled by the system controller. The method includes the steps of storing, searching, determining, and clearing. The storing step stores the management information to the management information storage when notification of remaining amount of the consumable supply is received from the image forming apparatus, in which the notification of remaining amount of the consumable supply includes the apparatus identification data for the management information. The searching step searches other management information including the apparatus identification data included in the management information stored in the management information storage. The determining step determines to deliver a spare consumable supply or to suspend a delivery of a spare consumable supply. In the determining step, issuing a delivery instruction of a spare consumable supply and storing a delivery-completed flag in the management information storage as one piece of data of the management information 1) if other management information, which has not been subjected to an information clearing process, is not retrieved by the searching step or 2) if other management information, which has not been subjected to an information clearing process and does not include a delivery-completed flag, is retrieved by the searching step. In the determining step, suspending a delivery instruction of a spare consumable supply 3) if other management information, which has not been subjected to an information clearing process and has a delivery-completed flag, is retrieved by the searching step. The clearing step clears the management information including the apparatus identification data included in consumable supply replacement information when the consumable supply replacement information, indicating detection of replacement of the consumable supply in the image forming apparatus, is received from the image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 shows example data stored in information storage, in which

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, a consumable supply management system according to an exemplary embodiment is described with reference to FIGS. 1 to 7. In this description, the consumable supply management system may be used as a toner supply management system for an image forming apparatus, but not limited to thereto. Hereinafter, a toner bottle is used as an example of consumable supply.

Figure 1:
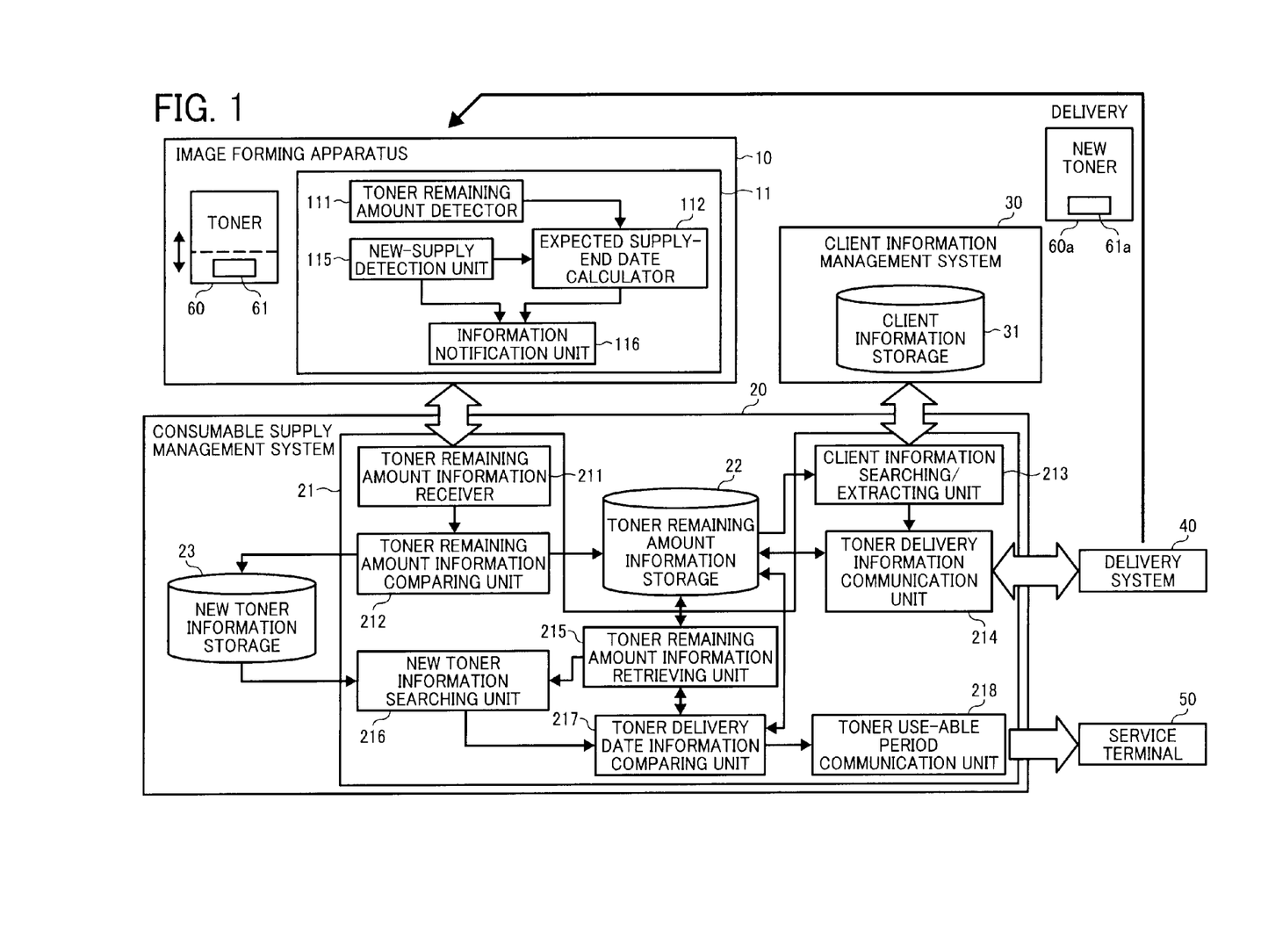
FIG. 1 shows a schematic configuration of a consumable supply management system according to an example embodiment.

As shown in FIG. 1, an image forming apparatus 10 is coupled to a consumable supply management system 20 via a network. The image forming apparatus 10 includes a toner bottle 60 storing a given volume of toner, which is to be used for image forming operations. Such toner bottle 60 is used as a consumable supply because toner is consumed as image forming operation is conducted. The toner bottle 60 is installed or set in the image forming apparatus 10, for example. The toner bottle 60 is attached with an IC (integrated circuit) chip 61. The IC chip 61 stores a toner identifier (or toner ID) to identify each of toner bottles. Typically, each of toner bottles has a unique ID such as manufacturing number or the like. Further, the toner ID includes a toner color identifier to identify color of toner stored in the toner bottle 60.

The image forming apparatus 10 may include a memory, which may be called as a process log data storage, and a control unit 11. The process log data storage is stored with information such as total number of printed sheets, which are printed from a time when a new toner bottle is installed to the image forming apparatus 10, in which the number of printed sheets of same size are counted, and then the total number of printed sheets are counted by adding the number of printed sheets of different sizes, and image-composing dots N (average) for each color and each size of sheet are counted. Further, the control unit 11 may include a central processing unit (CPU), a random access memory (RAM), and a read only memory (ROM), for example.

Further, the control unit 11 may include an image forming processing unit. The image forming processing unit conducts printing operations to a recording medium (e.g., sheet) using toner stored in the toner bottle 60 based on image data acquired for image forming. Specifically, the image forming processing unit controls a laser beam to form an electrostatic latent image on a surface of photoconductor drum, for example. Further, the image forming processing unit adds the number of recording media, which are just now printed with images, to the total number of printed sheets stored in the process log data storage to store updated total number of printed sheets in the process log data storage.

Further, the image forming processing unit counts dot numbers composing one image, formed on a surface of photoconductor drum by irradiating a laser beam, and stores counted (average) image-composing dots N information for each sheet size in the process log data storage.

Further, the control unit 11 may include a toner remaining amount detector 111, an expected supply-end date calculator 112, a new-supply detection unit 115, and an information notification unit 116, for example.

The toner remaining amount detector 111 computes toner amount remaining in the toner bottle 60, and determines whether the computed toner amount, remaining in the toner bottle 60, becomes a threshold value or less. Specifically, the toner remaining amount detector 111 stores a formula for computing toner consumption amount, a formula for computing a toner remaining amount, and data of threshold value for remaining toner amount. The formula for computing toner consumption amount is used to compute a toner amount consumed from the toner bottle 60 from a time that a new toner bottle is installed in the image forming apparatus 10 to a present day. Specifically, when a new toner bottle is installed in the image forming apparatus 10, such new toner bottle is filled with a given volume of toner. Then, as toner is used for image forming operations, toner is consumed for a given amount from the toner bottle 60. A formula (1) shown in FIG. 3 can be used to compute the total toner consumption amount of the toner bottle 60, for example.

Figure 3:
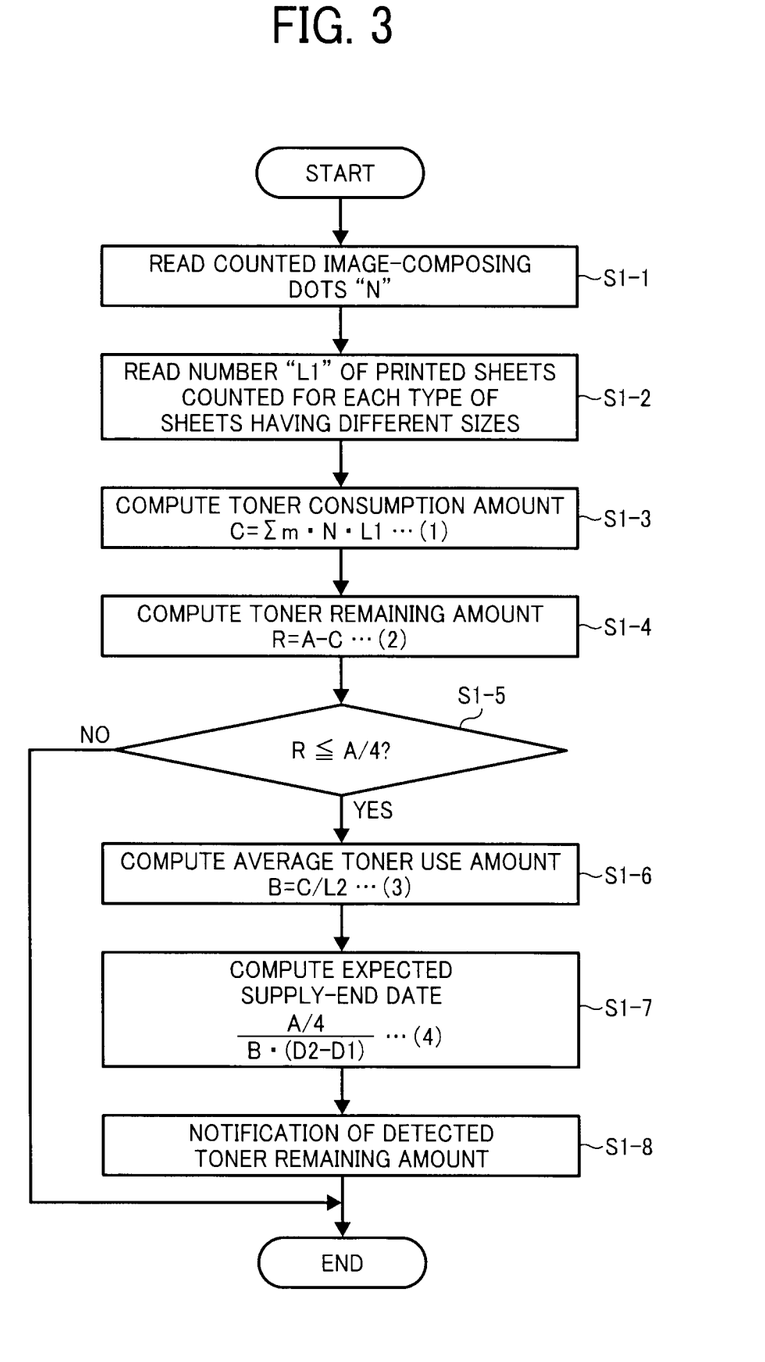
FIG. 3 shows a flowchart for process of detecting remaining toner amount for an image forming apparatus.

In the formula (1), "m" represents data of toner weight that adheres one single dot included in one image formed on a surface of a photoconductor drum. The data of toner weight may be stored in the image forming apparatus 10 in advance. "N" represents average dot numbers for each of color images (e.g., cyan, magenta, yellow, black) included in one image formed on a single sheet, which is used as a recording medium. The size of sheet may vary such as A4, A3, and so forth depending on image forming conditions. Accordingly, a multiplication of "m" and "N" ("m×N") becomes a toner amount used for image forming operation on one single recording medium having a given size, wherein such toner amount used for image forming operation may mean toner consumption amount from the toner bottle 60. Further, "L1" represents a total number of printed sheets used for image forming operations in a given period of time, in which "L1" may be counted for each type of sheets having different sizes. Accordingly, the formula (1) of "C=Σ(m×N×L1)" indicates the total toner consumption amount "C" consumed from the toner bottle 60 when image forming operations are conducted using sheets having different sizes.

Further, a formula (2) shown in FIG. 3 is used to compute toner amount remaining in the toner bottle 60, wherein toner amount remaining "R" in toner bottle is defined as "R=A−C." In the formula (2), "A" represents an initial toner amount filled in a new toner bottle when the new toner bottle is installed in the image forming apparatus 10, wherein such initial toner amount may be a designed toner storage capacity set for the toner bottle 60. Accordingly, toner amount remaining in the toner bottle 60 can be computed by subtracting "C," obtained at step S1-2, from "A." Further, a threshold value for remaining amount of toner may be stored in a memory. For example, one-fourth (¼) of toner capacity of the toner bottle 60 may be stored in a memory as a threshold value for remaining amount of toner.

The expected supply-end date calculator 112 computes expected supply-end date of toner when the toner remaining amount becomes the threshold value for remaining amount or less. Accordingly, the expected supply-end date calculator 112 stores a formula for computing an average toner usage amount, a formula for computing expected supply-end date, and data of toner-bottle set date used for such formulas. The average toner usage amount per sheet can be computed using a formula (3) shown in FIG. 3. In the formula (3), "L2" represents a total number of printed sheets composed of all types of sheets having different size.

The expected supply-end date can be computed using a formula (4) shown in FIG. 3. The expected supply-end date is a date that toner in the toner bottle 60 is to be consumed almost completely. Accordingly, by computing the expected supply-end date, a time span between a date that the toner remaining amount becomes the threshold value (e.g., ¼) of initial toner amount and a date that toner end occurs can be determined. Because an actual toner end date may not be accurately predicted, such expected supply-end date may be computed as an approximate reference date to predict a possible toner end date. Accordingly, it should be noted that such expected supply-end date may not match to an actual toner-end date. However, the computed expected supply-end date can be effectively used to determine a replacement timing of the toner bottle 60.

In the formula (4), "D1" represents a toner-bottle set date, at which the toner bottle 60 was installed in the image forming apparatus 10, and "D2" represents a present day, at which a present status of toner bottle may be checked. Further, the expected supply-end date calculator 112 stores data on toner-secured days computed based on the computed expected supply-end date. The toner-secured days may be set to secure toner supply used for image forming operations at a client location. For example, the toner-secured days may be set to one-half (½) of the expected supply-end date.

The new-supply detection unit 115 can detect an installation of new toner bottle in the image forming apparatus 10. Specifically, the new-supply detection unit 115 stores a toner ID of the toner bottle 60, presently installed in the image forming apparatus 10, in a memory. In the image forming apparatus 10, the new-supply detection unit 115 is used to check the toner ID of the presently installed toner bottle 60 periodically. For example, the new-supply detection unit 115 reads the toner ID from the IC chip 61 attached on the toner bottle 60 at a given clock time every day. Then, the new-supply detection unit 115 compares the toner ID, read from the IC chip 61, and a toner ID, presently stored in the memory for the new-supply detection unit 115.

If it is determined that such two toner IDs are different, the new-supply detection unit 115 stores the new toner ID read from the IC chip 61 to the memory, and transmits the new toner ID to the information notification unit 116.

Further, the new-supply detection unit 115 sets a date when the new toner ID is read as above described as a present day, and the present day is stored as a toner-bottle set date, and transmits the toner-bottle set date to the expected supply-end date calculator 112.

The information notification unit 116 informs information of toner bottle 60 to the consumable supply management system 20. Such information of toner bottle 60 may be notification of toner remaining amount or notification of new toner bottle detection, for example. The notification of toner remaining amount includes information of toner amount remaining in the toner bottle installed in the image forming apparatus 10. The notification of new toner bottle detection includes information that an installation of new toner bottle in the image forming apparatus 10 is detected. The information notification unit 116 stores apparatus type identifier and apparatus serial number of the image forming apparatus 10, and data of presently used toner ID in a memory.

When the information notification unit 116 receives the expected supply-end date and toner-secured days from the expected supply-end date calculator 112, the information notification unit 116 transmits notification of toner remaining amount to the consumable supply management system 20. Further, when the information notification unit 116 receives a new toner ID from the new-supply detection unit 115, the information notification unit 116 transmits the notification of new toner bottle detection to the consumable supply management system 20.

The image forming apparatus 10 is coupled to the consumable supply management system 20, which is used for managing the toner bottle 60, via a network. As shown in FIG. 1, the consumable supply management system 20 may be further coupled or connected to a client information management system 30, a delivery system 40, and a service terminal 50, for example. The delivery system 40 is used to deliver the toner bottle 60 to a given client. The service terminal 50 may be used by a sales person who is in charge of maintenance works of a given image forming apparatus used at a given client.

The consumable supply management system 20 may include a system controller 21 as a control unit of the consumable supply management system 20, a toner remaining amount information storage 22, and a new toner information storage 23, for example. The toner remaining amount information storage 22 may function as a management information storage, and the new toner information storage 23 may function as a consumable supply replacement information storage.

The system controller 21 may include a CPU (central processing unit), a RAM (random access memory), and a ROM (read only memory), or the like, and may control processes such as remaining amount information storing process, search process, delivery instruction process, information clearing process, consumable supply replacement information storing process, expected delivery date information storing process, and message communication process. The system controller 21 may include a plurality of functions, which can be executed by using a given consumable supply management program. For example, as shown in FIG. 1, the system controller 21 may include a toner remaining amount information receiver 211, a toner remaining amount information comparing unit 212, a client information searching/extracting unit 213, and a toner delivery information communication unit 214, for example. Further, the system controller 21 may include a toner remaining amount information retrieving unit 215, a new toner information searching unit 216, a toner delivery date information comparing unit 217, and a toner use-able period communication unit 218.

The toner remaining amount information receiver 211 receives information of toner bottle 60, detected in the image forming apparatus 10, and transmits the detected information of toner bottle 60 to the toner remaining amount information comparing unit 212. Such information of toner bottle 60, detected in the image forming apparatus 10, may be referred to as "detected-information," hereinafter, as required.

The toner remaining amount information comparing unit 212 may function as a remaining amount information recording unit and a consumable supply replacement information recording unit. Specifically, the toner remaining amount information comparing unit 212 stores the detected-information to the toner remaining amount information storage 22 or the new toner information storage 23 depending on types of the detected-information received from the image forming apparatus 10.

The client information searching/extracting unit 213 searches and extracts client information from the client information management system 30 when to deliver a new toner bottle (or spare toner bottle) to a given client, wherein the client information may be used to determine a delivery location or destination, for example.

The toner delivery information communication unit 214 may function as a delivery date information recording unit, and receives information from the client information searching/extracting unit 213, which is to be used as toner delivery information. Then, the toner delivery information communication unit 214 communicates information with the delivery system 40 to instruct a delivery instruction process of a new toner bottle (or spare toner bottle) to the delivery system 40.

The toner remaining amount information retrieving unit 215 may function as a searching unit and a delivery instruction unit. The toner remaining amount information retrieving unit 215 retrieves information of toner bottle periodically from the toner remaining amount information storage 22. Specifically, The toner remaining amount information retrieving unit 215 retrieves information of toner bottle if it is confirmed that a delivery of new toner bottle (or spare toner bottle) is not conducted even if a present day is behind an expected delivery date of new toner bottle.

The toner remaining amount information retrieving unit 215 transmits information of apparatus type identifier and apparatus serial number included in the retrieved information of toner bottle (e.g., information of remaining amount of toner) to the new toner information searching unit 216 and the toner delivery date information comparing unit 217.

Based on the apparatus type identifier and apparatus serial number, the new toner information searching unit 216 searches new toner information, which can be matched to the retrieved information for toner bottle.

The toner delivery date information comparing unit 217 may function as an information clearing unit. Specifically, the toner delivery date information comparing unit 217 conducts an information clearing process of toner bottle information such as information of remaining amount of toner based on the above-mentioned retrieved toner remaining amount information and the above-mentioned searched new toner information. Further, the toner delivery date information comparing unit 217 may generate a message communication.

The toner use-able period communication unit 218 may function as a message communication unit. Specifically, the toner use-able period communication unit 218 informs a message communication, received from the toner delivery date information comparing unit 217, to the service terminal 50. A sales person who is in charge of maintenance works for a given client may check the message communication. Such message communication may include situation information of the toner bottle 60.

Figure 2A:
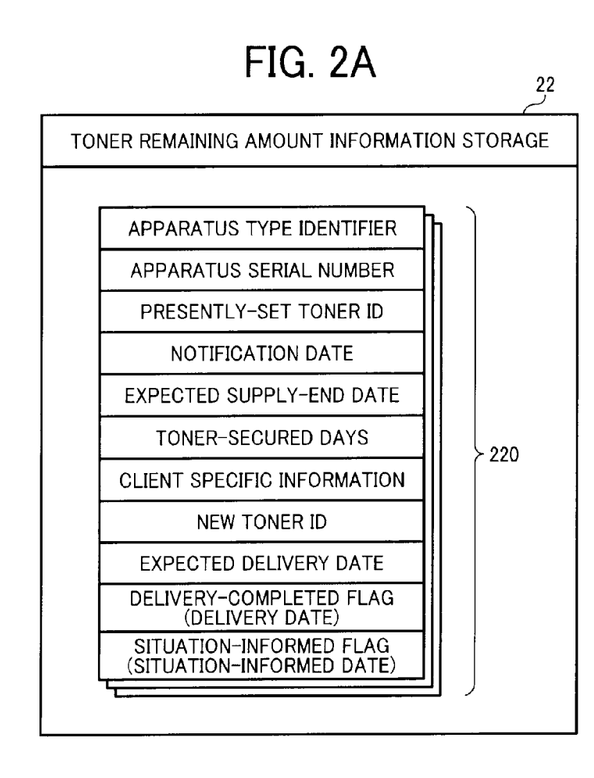
FIG. 2A shows data stored in a toner remaining amount information storage.

As shown in FIG. 2A, the toner remaining amount information storage 22 stores toner remaining amount information 220, which is stored for the toner bottle 60. The toner remaining amount information 220 is stored in the toner remaining amount information storage 22 when a notification of toner remaining amount of the toner bottle 60 is transmitted from the image forming apparatus 10 to the consumable supply management unit 20. The toner remaining amount information 220 may include information of apparatus type identifier, apparatus serial number, presently-set toner ID, notification date, expected supply-end date, toner-secured days, client specific information, new toner ID, expected delivery date (of spare toner bottle), delivery-completed flag, and situation-informed flag, for example.

Apparatus type identifier information field is stored with information of apparatus type identifier used to identify types of the image forming apparatus 10, which transmits a notification of toner remaining amount at a given timing.

Apparatus serial number information field is stored with information of manufacturing serial number of apparatus (or apparatus serial number) of the image forming apparatus 10. In an example embodiment, the image forming apparatus 10 can be identified by using such apparatus type identifier and apparatus serial number, for example. Such apparatus type identifier and apparatus serial number may be collectively referred to as an apparatus identification data.

Presently-set toner ID information field is stored with information of toner ID of the toner bottle 60 presently installed in the image forming apparatus 10. Accordingly, by checking the presently-set toner ID, a toner bottle installed in the image forming apparatus 10 at present can be identified.

Notification date information field is stored with information of notification date (e.g., year/month/date) when detected-information is transmitted from the image forming apparatus 10 to the consumable supply management system 20, wherein the detected-information may be a notification of toner remaining amount, for example.

Expected supply-end date information field is stored with information of expected toner end day of the toner bottle 60 presently installed in the image forming apparatus 10. At the expected toner end day, toner may be consumed almost completely from the toner bottle 60 presently installed in the image forming apparatus 10. It should be noted that the expected supply-end date is computed as an approximate reference date to predict a possible toner end date. Accordingly, such expected supply-end date may not match to an actual toner-end date. However, the computed expected supply-end date can be effectively used to determine a replacement timing of the toner bottle 60.

Toner-secured days information field is stored with information of toner-secured days, in which toner can be securely used for image forming operations at a client location. The toner-secured days can be computed from the expected supply-end date using a given function.

Client specific information field is stored with information of client specific information. The client specific information may include client name, postal address, telephone number, e-mail address of the service terminal 50 used by a sales person who is in charge for a given client, for example.

New toner ID information field is stored with information of a toner ID of a new toner bottle (or spare toner bottle), which is delivered to a given client and to be installed in the image forming apparatus 10 when a replacement timing of toner bottle 60 has come at a given timing.

Expected delivery date information field is stored with information of expected delivery date of a new toner bottle (or spare toner bottle), which is to be delivered to a given client. The expected delivery date may include three types of information: standard (or normal) delivery date, which is set when a consumable supply is delivered with a standard process; earliest delivery date (MIN) that a consumable supply is delivered earliest timing; latest delivery date (MAX) that a consumable supply is delivered latest timing.

Delivery-completed flag information field is stored with a delivery-completed flag indicating a delivery of a new toner bottle (or spare toner bottle) has completed. In an example embodiment, the delivery-completed flag may be stored with information of delivery date. For example, the delivery date may mean a date when a consumable supply is shipped from a service center, which stocks consumable supplies, but not limited these.

Situation-informed flag information field is stored with a situation-informed flag indicating that a given message communication is informed to a sales person in charge of maintenance works for a given client. In an example embodiment, the situation-informed flag may be stored with information of situation-informed date that the given message communication is informed to the sales person.

Figure 2B:
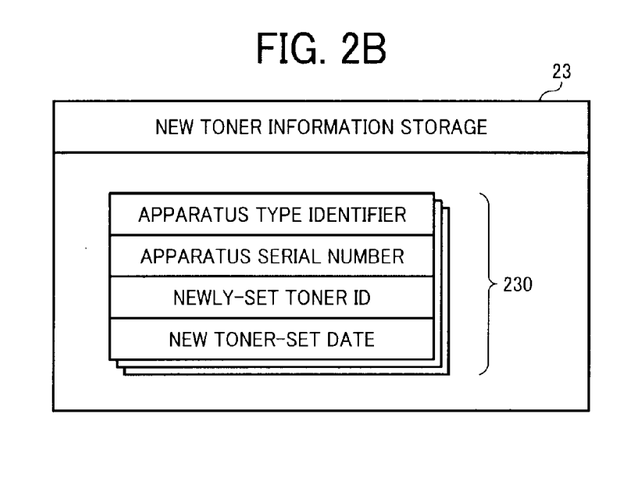
FIG. 2B shows data stored in a new toner information storage.

Further, as shown in FIG. 2B, the new toner information storage 23 stores new toner information 230 of the toner bottle 60 when a notification of new toner bottle detection is received by the consumable supply management system 20 from the image forming apparatus 10. The new toner information 230 is stored with information when the notification of new toner bottle detection is transmitted from the image forming apparatus 10 to the consumable supply management system 20. The new toner information 230 may include information of apparatus type identifier, apparatus serial number, newly-set toner ID, and new toner-bottle set date (new toner-set date).

Apparatus type identifier information field is stored with information of apparatus type identifier used to identify types of the image forming apparatus 10, which transmits the notification of new toner bottle detection.

Apparatus serial number information field is stored with information of manufacturing serial number of apparatus (or apparatus serial number) of the image forming apparatus 10.

Newly-set toner ID information field is stored with information of a toner ID of a toner bottle newly installed in the image forming apparatus 10. Accordingly, by checking the newly-set toner ID information, a new toner bottle installed in the image forming apparatus 10 can identified.

New toner-bottle set date information field is stored with information of a date (e.g., year/month/date) that a notification of new toner bottle detection is transmitted from the image forming apparatus 10 to the consumable supply management system 20. The notification of new toner bottle detection is transmitted to the consumable supply management system 20 after a new toner bottle (or spare toner bottle) is installed in the image forming apparatus 10.

Figure 2C:
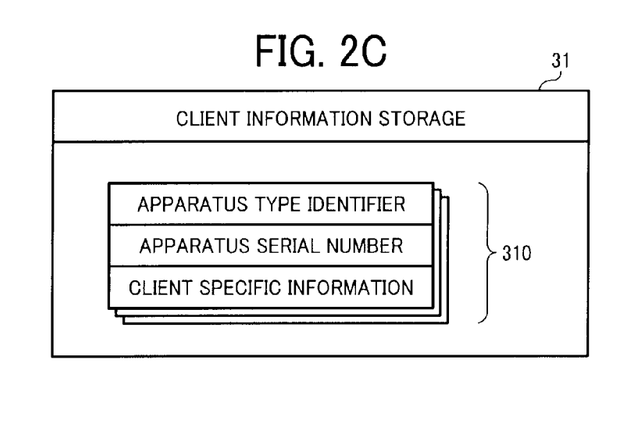
FIG. 2C shows data stored in a client information storage.

The client information management system 30 shown in FIG. 1 manages client information. The client information management system 30 may include a client information storage 31, which is used to store client information. As shown in FIG. 2C, the client information storage 31 stores client information 310. The client information 310 is stored in the client information storage 31 when client information is input. The client information 310 may include information of apparatus type identifier and apparatus serial number, and client specific information, for example.

Apparatus type identifier information field is stored with information of apparatus type identifier used to identify types of the image forming apparatus 10, which transmits the notification of new toner bottle detection.

Apparatus serial number information field is stored with information of manufacturing serial number of apparatus (or apparatus serial number) of the image forming apparatus 10.

Client specific information field is stored with information of client specific information. For example, the client specific information may include information of client name, postal address, telephone number, and e-mail address of the service terminal 50 used by a sales person who is in charge of a given client.

The delivery system 40 is used to deliver a new toner bottle (or spare bottle) to a given location or destination. The delivery system 40 receives a delivery instruction from the consumable supply management system 20, and then the delivery system 40 is used to deliver a new toner bottle based on the delivery instruction. Then, the delivery system 40 transmits delivery information including a delivery date to the consumable supply management system 20 after conducting a delivery process. The delivery date may be a date that a new toner bottle leaves a service center of consumable supply, for example, and is correlated to the apparatus type identifier and apparatus serial number included in the delivery instruction.

Further, a sales person in charge of maintenance works for a given client may check the service terminal 50 whether a new toner bottle (or spare bottle) is correctly delivered to the given client in line of the delivery instruction.

A description is now given to the consumable supply management system 20, which manages inventory status of the toner bottle 60 with reference to FIGS. 3 to 7. A description is given to notification process of detected-information, a delivery instruction process, and an information clearing process. The notification process of detected-information may be conducted when the consumable supply management system 20 receives notification of toner remaining amount or notification of new toner bottle detection from the image forming apparatus 10. A description is given to a process of detecting remaining amount of toner, and a process of detecting new supply detection for the image forming apparatus 10.

A description is now given to a process of detecting remaining amount of toner for the image forming apparatus 10 with reference to FIG. 3. The process of detecting remaining amount of toner may be conducted periodically (e.g., every day). For example, the process of detecting remaining amount of toner may be conducted at a given clock time, which is set and stored for the image forming apparatus 10.

At step S1-1, the control unit 11 of the image forming apparatus 10 conducts a reading process for reading counted image-composing dots N for each color. Specifically, the toner remaining amount detector 111 of the control unit 11 obtains dot count information of each color from the process log data storage.

At step S1-2, the control unit 11 conducts a reading process for reading the number of printed sheets counted for each type of sheets having different sizes. Specifically, the toner remaining amount detector 111 of the control unit 11 obtains information of the number of printed sheets, printed by using one new toner bottle set in the image forming apparatus 10 at a given date (e.g., toner-bottle set date) and used for image forming operations since such toner-bottle set date, from the process log data storage, wherein the number of printed sheets is counted for each type of sheets having different size.

At step S1-3, the control unit 11 computes toner consumption amount for each color of toner. Specifically, the toner remaining amount detector 111 of the control unit 11 computes the toner consumption amount for each of color by inputting the counted image-composing dots N and the number of printed sheets L1 counted for each type of sheets having different sizes into the formula (1).

At step S1-4, the control unit 11 computes toner remaining amount for each color of toner. Specifically, the toner remaining amount detector 111 of the control unit 11 computes the toner remaining amount by inputting the toner consumption amount computed at step S1-3 to the formula (2).

At step S1-5, the control unit 11 determines whether the computed toner remaining amount becomes a threshold value or less. Specifically, the toner remaining amount detector 111 of the control unit 11 compares the computed toner remaining amount for each color with a given threshold volume set for the toner bottle 60. For example, one fourth (¼) of an initial toner volume of the toner bottle 60 is set as a given threshold volume. If it is determined that the toner remaining amount of the toner bottle 60 is greater than the threshold value (No at step S1-5), the toner remaining amount detector 111 ends the process of detecting remaining toner amount.

On one hand, if it is determined that the toner remaining amount of the toner bottle 60 becomes the threshold value or less (YES at step S1-5), the control unit 11 computes average toner use amount of the toner bottle 60 at step S1-6. Specifically, the expected supply-end date calculator 112 of the control unit 11 receives data of the computed toner consumption amount from the toner remaining amount detector 111.

The expected supply-end date calculator 112 computes the total number of printed sheets L2, which is a sum of the numbers of printed sheets having different sizes. Then, the expected supply-end date calculator 112 computes the average toner usage amount "B" by dividing the toner consumption amount C with the computed total number of printed sheets L2 as indicated by a formula (3) shown in FIG. 3.

At step S1-7, the control unit 11 computes an expected supply-end date of the toner bottle 60. At such expected supply-end date, the toner remaining amount in the toner bottle 60 may be consumed almost completely. Specifically, the expected supply-end date calculator 112 of the control unit 11 computes the expected supply-end date by inputting a present date D2, obtained from a system calendar of the image forming apparatus 10, the toner consumption amount C computed at step S1-3, the toner-bottle set date D1 stored in a memory, and an initial toner capacity A set for a new toner bottle into the formula (4).

At step S1-8, the control unit 11 of the image forming apparatus 10 notifies detected information on toner remaining amount for the toner bottle 60 to the consumable supply management system 20. Specifically, the information notification unit 116 of the control unit 11 obtains data of the expected supply-end date and toner-secured days from the expected supply-end date calculator 112. Then, the information notification unit 116 generates notification of toner remaining amount as detected-information, and transmits the notification of toner remaining amount to the consumable supply management system 20. The notification of toner remaining amount may include data of apparatus type identifier, apparatus serial number and toner ID stored for the image forming apparatus 10, the computed expected supply-end date, toner-secured days, and color of toner. By conducting such process, the control unit 11 ends the process of detecting remaining toner amount.

Figure 4:
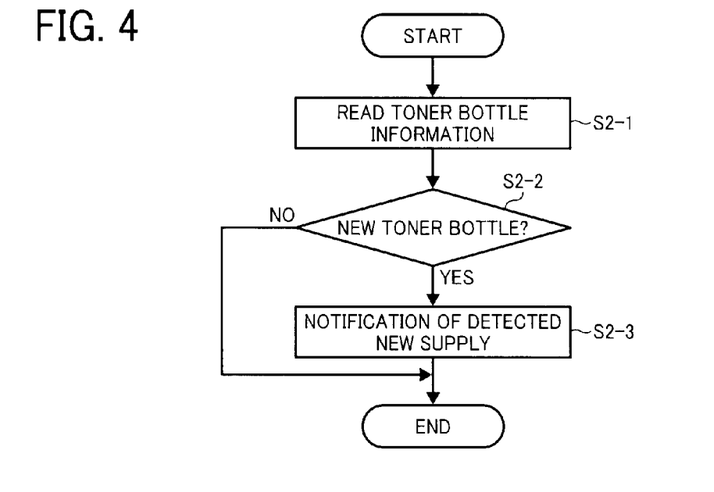
FIG. 4 shows a flowchart for process of detecting new supply for an image forming apparatus.

A description is now given to a process of detection of new consumable supply (e.g., new toner bottle) for the image forming apparatus 10 with reference to FIG. 4, wherein such process may be referred to as a new supply detection process. The new supply detection process may be conducted periodically. For example, the new supply detection process may be conducted at a given clock time every day, wherein such clock time may be set and stored in the image forming apparatus 10. With such new supply detection process, an installation of a new toner bottle (or spare toner bottle) can be detected effectively.

At step S2-1, the control unit 11 of the image forming apparatus 10 reads toner bottle information of the toner bottle 60 installed in the image forming apparatus 10. Specifically, the new-supply detection unit 115 of the control unit 11 reads the toner ID from the IC chip 61 attached to the toner bottle 60, which is installed in the image forming apparatus 10.

At step S2-2, the control unit 11 determines whether a new toner bottle (or spare toner bottle) is installed in the image forming apparatus 10. Specifically, the new-supply detection unit 115 compares a toner ID read from the IC chip 61 and a toner ID stored in a memory.

If it is determined that the toner ID read from the IC chip 61 and the toner ID stored in the memory are identical (NO at step S2-2), the control unit 11 ends the new supply detection process.

On one hand, if it is determined that the toner ID read from the IC chip 61 and the toner ID stored in the memory are not identical (Yes at step S2-2), the control unit 11 conducts a notification process of detection of new toner bottle at step S2-3. Specifically, the information notification unit 116 of the control unit 11 obtains the toner ID, read from the IC chip 61, as a new toner ID, from the new-supply detection unit 115. Then, the information notification unit 116 generates notification of new toner bottle detection as detected-information, and transmits the notification of new toner bottle detection to the consumable supply management system 20. The notification of new toner bottle detection generated by the information notification unit 116 includes the apparatus type identifier and apparatus serial number stored in a memory, and newly obtained toner ID, for example.

At step S2-3, the new-supply detection unit 115 of the control unit 11 sets a present date that a new toner bottle is installed in the image forming apparatus 10 as a toner-bottle set date, and transmits information of the toner-bottle set date to the expected supply-end date calculator 112. Then, the expected supply-end date calculator 112 receives information of the toner-bottle set date, and updates the toner-bottle set date. With such processes, the control unit 11 ends the new supply detection process.

Figure 5:
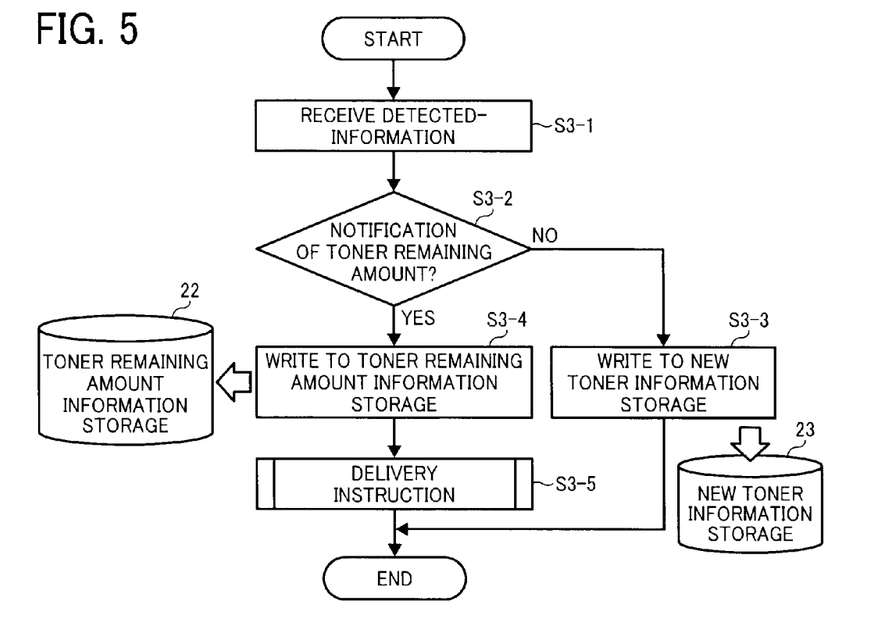
FIG. 5 shows a flowchart for process of notification process of detected-information for a consumable supply management system.

A description is now given to processing to be conducted by the consumable supply management system 20. Such processing may include processes for detected-information, delivery instruction and information clearing.

When the consumable supply management system 20 receives the detected-information from the image forming apparatus 10, following steps may be conducted. Such detected-information received from the image forming apparatus 10 may be the notification of toner remaining amount generated at the above-described notification process of toner remaining amount (step S1-8), or the notification of new toner bottle detection generated at the above-described notification process of detected new supply (step S2-3).

At step S3-1, the system controller 21 of the consumable supply management system 20 receives the detected-information from the image forming apparatus 10. Specifically, the toner remaining amount information receiver 211 of the system controller 21 receives the detected-information from the image forming apparatus 10, and then transmits the received detected-information to the toner remaining amount information comparing unit 212.

At step S3-2, the system controller 21 determines whether the detected-information, received from the image forming apparatus 10, is the notification of toner remaining amount or notification of new toner bottle detection.

If the notification of toner remaining amount is included in the detected-information, the toner remaining amount information comparing unit 212 of the system controller 21 determines that the received detected-information is the notification of toner remaining amount. On one hand, if the notification of new toner bottle detection is included in the detected-information, the toner remaining amount information comparing unit 212 determines that the received detected-information is the notification of new toner bottle detection.

If the received detected-information is the notification of new toner bottle detection (No at step S3-2), the system controller 21 of the consumable supply management system 20 conducts a data writing process to the new toner information storage 23 at step S3-3. Specifically, the toner remaining amount information comparing unit 212 of the system controller 21 retrieves apparatus type identifier, apparatus serial number, and toner ID from the notification of new toner bottle detection. The toner remaining amount information comparing unit 212 generates an updated new toner information as new toner information 230 including the apparatus type identifier, apparatus serial number, and toner ID, and stores the updated new toner information to the new toner information storage 23. Further, the toner remaining amount information comparing unit 212 stores the updated new toner information by including the present date as a new toner-bottle set date, at which a new toner bottle is set in the image forming apparatus 10. With such processes, the system controller 21 ends the data writing process for the detected-information.

On one hand, if the received detected-information is the notification of toner remaining amount (Yes at step S3-2), the system controller 21 of the consumable supply management system 20 conducts a data writing process to the toner remaining amount information storage 22 at step S3-4. Specifically, the toner remaining amount information comparing unit 212 of the system controller 21 retrieves apparatus type identifier, apparatus serial number, toner ID, expected supply-end date, and toner-secured days from the notification of toner remaining amount. Then, the toner remaining amount information comparing unit 212 generates an updated toner remaining amount information as toner remaining amount information 220 including the apparatus type identifier, apparatus serial number, toner ID, expected supply-end date, and toner-secured days, and stores the updated toner remaining amount information to the toner remaining amount information storage 22. Further, the toner remaining amount information comparing unit 212 stores a present date as a notification date in the updated toner status information, wherein a new toner bottle is set at the present date.

Figure 6:
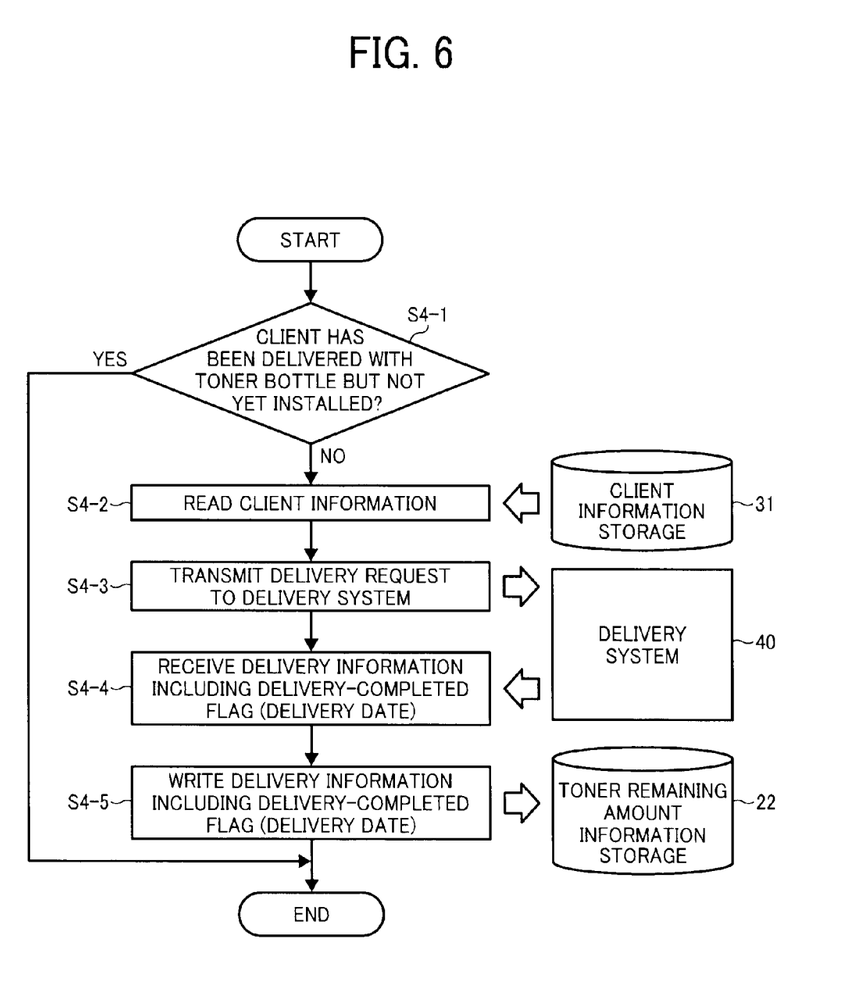
FIG. 6 shows a flowchart for process of delivery instruction for a consumable supply management system.

At step S3-5, the system controller 21 conducts a delivery instruction process, wherein such delivery instruction process is described in detail with reference to FIG. 6. As shown in FIG. 6, at step S4-1, the system controller 21 of the consumable supply management system 20 determines whether a new toner bottle (or spare toner bottle), already delivered to a client, is installed or not in the image forming apparatus 10. Specifically, the toner remaining amount information retrieving unit 215 of the system controller 21 searches the toner remaining amount information storage 22 in the toner remaining amount information 220 based on apparatus type identifier and apparatus serial number obtained from the notification of toner remaining amount.

Further, the toner remaining amount information retrieving unit 215 searches whether there is another toner remaining amount information 220 in the retrieved toner remaining amount information 220, in which the toner remaining amount information 220 that comes before the notification date is searched. In this case, the toner remaining amount information retrieving unit 215 compares toner color identifier included in the presently-set toner ID, and searches whether there is another toner remaining amount information 220 having a same color.

In this case, if corresponding toner remaining amount information 220 can be searched and retrieved, it is determined that a new toner bottle (or spare toner bottle) is already delivered to a client location, and the new toner bottle is not yet installed in the image forming apparatus 10 (YES at step S4-1). Then, the system controller 21 of the consumable supply management system 20 ends the delivery instruction process, by which a new toner bottle (or spare toner bottle) is suspended, which means a new toner bottle is not delivered to the client location.

On one hand, if corresponding toner remaining amount information 220 cannot be searched and retrieved, it is determined that a new toner bottle (or spare toner bottle) is not delivered yet, and thereby the new toner bottle is not yet installed in the image forming apparatus 10 (No at step S4-1). Then, the system controller 21 of the consumable supply management system 20 reads client information at step S4-2. Specifically, the toner remaining amount information retrieving unit 215 of the system controller 21 instructs the client information searching/extracting unit 213 to obtain client information. The client information searching/extracting unit 213 transmits a client information request to the client information management system 30, wherein the client information request includes apparatus type identifier and apparatus serial number. Then, the client information management system 30 retrieves the client information 310 including the corresponding apparatus type identifier and apparatus serial number from the client information storage 31, and transmits the client information 310 to the consumable supply management system 20.

At step S4-3, the system controller 21 of the consumable supply management system 20 issues a delivery request. Specifically, the toner delivery information communication unit 214 of the system controller 21 transmits the delivery request to the delivery system 40. The delivery request may include a delivery instruction including information of a given client required to be delivered with a new toner bottle (or spare toner bottle). Such information of the given client may be referred to as client specific information as above-mentioned, which includes client name, postal address, or the like.

At step S4-4, the system controller 21 of the consumable supply management system 20 receives delivery information including a delivery-completed flag. Specifically, the toner delivery information communication unit 214 of the system controller 21 receives the delivery information from the delivery system 40, wherein the delivery information is correlated to the corresponding apparatus type identifier and apparatus serial number. Such delivery information may include information on client-related information, date information (year/month/day) that a new consumable supply is dispatched or shipped (may be referred to a delivery date), and toner ID (e.g., new toner ID) of shipped new toner bottle used as a consumable supply. Further, such delivery information may include information of days required for delivering the new toner bottle to a given client location, and such days may be set in three levels for example: earliest delivery date; standard (or normal) delivery date; and latest delivery date.

At step S4-5, the system controller 21 conducts a data writing process for the delivery information including the delivery-completed flag. Specifically, the toner delivery information communication unit 214 of the system controller 21 retrieves the toner remaining amount information 220 including the corresponding apparatus type identifier and apparatus serial number from the toner remaining amount information storage 22. Then, the toner delivery information communication unit 214 stores information of client-related information, the new toner ID and the delivery date to the toner remaining amount information 220 in a memory.

Further, based on the delivery date, days required for delivery, and toner-secured days stored in the toner remaining amount information 220, the toner delivery information communication unit 214 computes expected delivery date of a new toner bottle (or spare toner bottle), and the expected delivery date may be computed in three levels: standard (or normal) expected delivery date; earliest delivery date (MIN); and latest delivery date (MAX). The toner delivery information communication unit 214 stores the standard (or normal) expected delivery date, earliest delivery date (MIN), and latest delivery date (MAX) in the toner remaining amount information 220.

With such processes, the delivery instruction process shown in FIG. 6 ends, by which the data writing process for the detected-information, shown in FIG. 5, ends.

Figure 7:
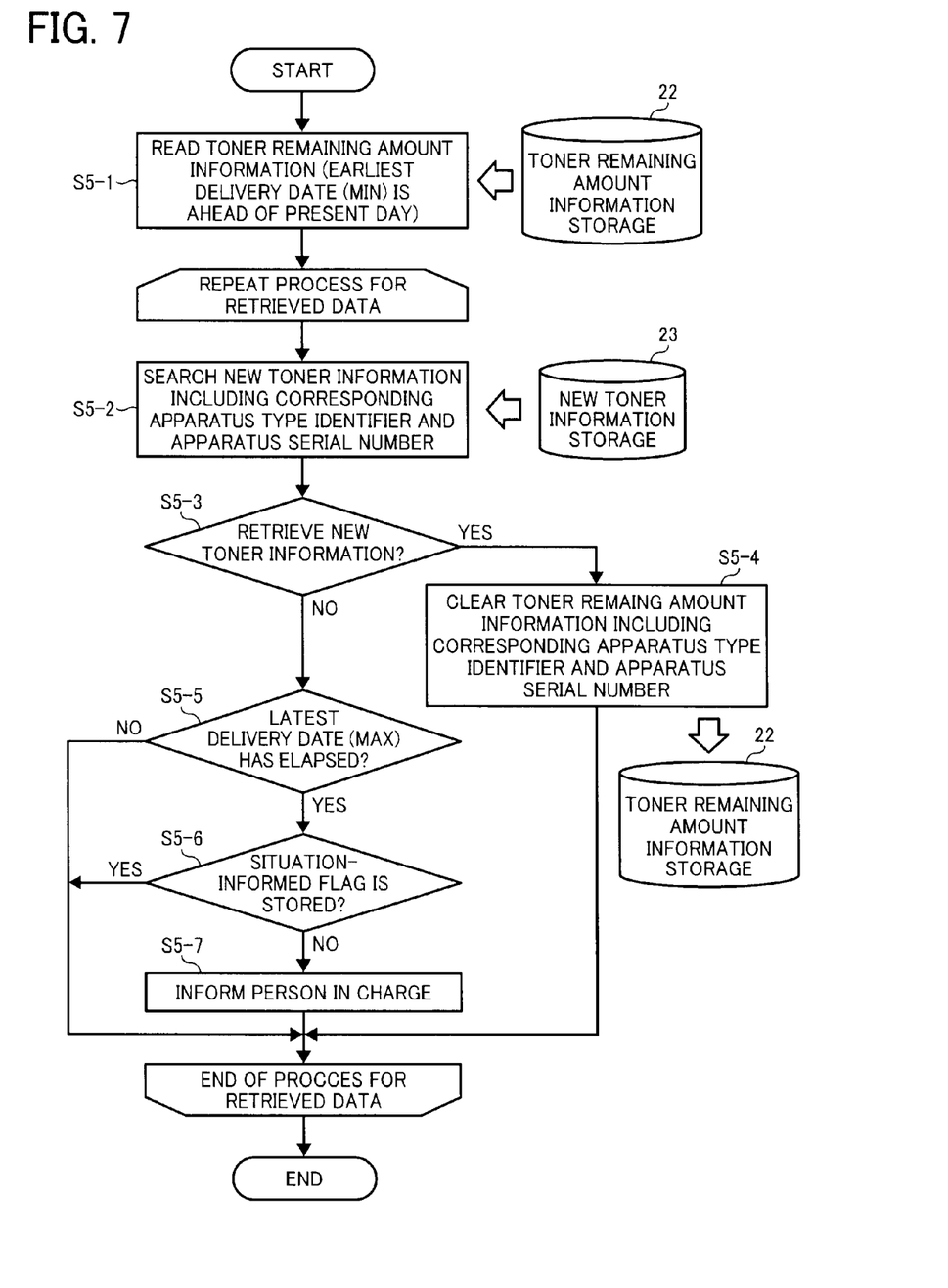
FIG. 7 shows a flowchart for process of information clearing for a consumable supply management system.

A description is now given to an information clearing process for information of remaining toner amount (e.g., toner remaining amount information 220) with reference to FIG. 7. The information clearing process may be conducted periodically (e.g., end of each day). For example, the information clearing process may be conducted when a clock time becomes a given time, set and stored for the image forming apparatus 10 in advance. In such clearing process, the toner remaining amount information 220 may be checked periodically, and if it is determined that given toner remaining amount information 220 is not necessary for managing the toner bottle 60, such information may be cleared, and not used for managing the toner bottle 60. After such clearing process, cleared information may be stored as history data.

In such process, a preset day is compared with an expected delivery date of toner bottle at first, wherein the present day is a day that the information clearing process is conducted. At step S5-1, the system controller 21 of the consumable supply management system 20 determines whether a preset day is ahead or behind the expected delivery date. Specifically, the toner remaining amount information retrieving unit 215 of the system controller 21 compares the earliest delivery date included in the toner remaining amount information 220 and the preset day, and determines whether the toner remaining amount information 220 includes the given earliest delivery date, which has already come before the present date, from the toner remaining amount information storage 22.

If it is determined that the toner remaining amount information 220 includes the given earliest delivery date, which has already come before the present date, the toner remaining amount information retrieving unit 215 transmits apparatus type identifier and apparatus serial number, included in the retrieved toner remaining amount information 220, to the new toner information searching unit 216 and the toner delivery date information comparing unit 217. The system controller 21 repeats following steps S5-2 to S5-7 for the toner remaining amount information 220 retrieved at step S5-1.

At step S5-2, the system controller 21 searches the new toner information stored in the new toner information storage 23 using the corresponding apparatus type identifier and apparatus serial number. Specifically, the new toner information searching unit 216 of the system controller 21 searches the new toner information 230 in the new toner information storage 23 using the corresponding apparatus type identifier and apparatus serial number, received from the toner remaining amount information retrieving unit 215.

If corresponding new toner information can be retrieved from the new toner information storage 23 (YES at step S5-3), the system controller 21 conducts an information clearing process to given toner remaining amount information, identified by the corresponding apparatus type identifier and apparatus serial number at step S5-4. Specifically, the toner delivery date information comparing unit 217 of the system controller 21 compares a newly-set toner ID set in the retrieved new toner information 230, and a new toner ID included in the toner remaining amount information 220 to determine whether two toner IDs are identical.

If it is determined that two toner IDs are identical, the toner delivery date information comparing unit 217 clears the toner remaining amount information 220 from the toner remaining amount information storage 22.

If it is determined that two toner IDs are not identical, the toner delivery date information comparing unit 217 transmits client-related information corresponded to the toner remaining amount information 220 to the toner use-able period communication unit 218. The toner use-able period communication unit 218 sends a message communication to the service terminal 50, used by a sales person in charge of a given client. For example, such message communication may be transmitted to the service terminal 50 using e-mail if the service terminal 50 has an e-mail address.

The toner use-able period communication unit 218 sends an e-mail to the service terminal 50 used by the sales person in charge of the given client, wherein the e-mail include client-related information (e.g., name, postal address) and a message that there is a difference between the installed toner ID and new toner ID. Based on the e-mail information displayed on the service terminal 50, the sales person contacts the client to check a situation of the image forming apparatus 10.

On one hand, if the consumable supply management system 20 cannot retrieve corresponding new toner information from the new toner information storage 23 (No at step S5-3), the system controller 21 determines whether the latest delivery date has elapsed for a concerned toner bottle at step S5-5. Specifically, the toner delivery date information comparing unit 217 of the system controller 21 compares the latest delivery date included in the toner remaining amount information 220 and the present date. If it is determined that the present date is still ahead of the latest delivery date (No at step S5-5), the system controller 21 ends the information clearing process for the toner remaining amount information 220.

On one hand, if it is determined that the present date is already behind the latest delivery date (YES at step S5-5), the system controller 21 determines whether such situation is already notified to the service terminal 50 at step S5-6. Specifically, the toner delivery date information comparing unit 217 of the system controller 21 determines whether a situation-informed flag is stored in the toner remaining amount information 220 at step S5-6. If the situation-informed flag is already stored (YES at step S5-6), the system controller 21 ends the information clearing process for the toner remaining amount information 220.

One on hand, if the situation-informed flag is not yet stored (No at step S5-6), the system controller 21 sends a message communication to the sales person in charge at step S5-7. Specifically, the toner delivery date information comparing unit 217 transmits client-related information corresponding to the toner remaining amount information 220 to the toner use-able period communication unit 218. Then, the toner use-able period communication unit 218 sends an e-mail to the service terminal 50, used by the sales person in charge, wherein the e-mail may include client-related information (e.g., name, postal address) and a message that a new toner bottle is not yet installed in the image forming apparatus. Based on the e-mail information displayed on the service terminal 50, the sales person in charge contacts a client to check a situation of the image forming apparatus 10. Further, the toner delivery date information comparing unit 217 stores a present date as a situation-informed date in a situation-informed flag information field of the toner remaining amount information 220. Such processes are sequentially repeated for the toner remaining amount information 220 retrieved at step S5-1.

In the above-described example embodiment, when the system controller 21 of the consumable supply management system 20 receives a notification of toner remaining amount from the image forming apparatus 10, the system controller 21 conducts a data writing process to the toner remaining amount information storage 22 (step S3-4), and conducts a delivery instruction process (step S3-5). In such delivery instruction process, if corresponding toner remaining amount information is retrieved from the toner remaining amount information storage 22 (YES at step S4-1), the system controller 21 ends the delivery instruction process to suspend a toner bottle delivery to a given client.

On one hand, if corresponding toner remaining amount information is not retrieved in the delivery instruction process (No at step S4-1), the system controller 21 conducts a delivery request process (step S4-3). Further, when the system controller 21 receives a notification of new toner bottle detection from the image forming apparatus 10, the system controller 21 conducts a data writing process to the new toner information storage 23 (step S3-3). Then, the system controller 21 conducts an information clearing process. In such information clearing process, the toner remaining amount information having the expected delivery date, which is already ahead of the present date, is read (step S5-1), and then the system controller 21 conducts a search process for new toner bottle information in the new toner information storage 23 (step S5-2) using the corresponding apparatus type identifier and apparatus serial number. If corresponding new toner bottle information can be retrieved (Yes at step S5-3), the system controller 21 conducts an information clearing process for toner remaining amount information having the corresponding apparatus type identifier and apparatus serial number (step S5-4). Accordingly, if the system controller 21 receives a notification of toner remaining amount indicating that toner amount in the toner bottle 60 becomes smaller, and when it is determined that a new toner bottle is already delivered to a client location but not yet installed in the image forming apparatus 10, the system controller 21 does not issue a delivery instruction of a new toner bottle (or spare toner bottle). Accordingly, in the present invention, delivered consumable supplies (e.g., toner bottle) may not be piled up at the client location, and thereby inventory of consumable supplies at the client location can be reduced. For example, the number of stocked toner bottle may be reduced to one bottle.

In the example embodiment, when the system controller 21 of the consumable supply management system 20 receives a notification of new toner bottle detection from the image forming apparatus 10, the system controller 21 conducts a data writing process to the new toner information storage 23 (step S3-3). Then, the system controller 21 may conduct an information clearing process at a given timing each day. For example, the system controller 21 may conduct an information clearing process at the end of each day. As such, the system controller 21 can conduct an information clearing process at one time using the notification of new toner bottle detection received in one given day.

In the example embodiment, the system controller 21 of the consumable supply management system 20 conducts a delivery request process (step S4-3), and conducts a data writing process for delivery information including a delivery-completed flag (step S4-5). In such data writing process for delivery information, the system controller 21 computes an expected delivery date based on delivery date, days required for delivery, and the toner-secured days of toner remaining amount information 220, wherein such expected delivery date may be set in three levels: earliest delivery date (MIN); standard (or normal) delivery date; and latest delivery date (MAX). Then, the system controller 21 stores the expected delivery date of earliest delivery date (MIN), standard (or normal) delivery date, and latest delivery date (MAX) in the toner remaining amount information 220.

In the information clearing process, when the system controller 21 retrieves new toner information corresponding to the apparatus type identifier and apparatus serial number, which is included in the toner remaining amount information having the expected delivery date, which is already ahead of the present day (YES at step S5-3), the system controller 21 determines whether the present date is behind the latest delivery date (step S5-5). If the present date is already behind the latest delivery date, and situation-information is not yet informed to the service terminal (No at step S5-6), the system controller 21 sends a message communication to a sales person in charge for a given client (step 55-7).

Accordingly, if the present date is already behind the latest delivery date, and a delivered consumable supply is not yet set by a client, the system controller 21 sends a message of situation-information to the service terminal 50 used by a sales person in charge of the client. When such situation-information is informed, an actual situation can be checked. For example, if a new toner bottle, which has been shipped, has not yet reached to the client location due to some reasons, another new toner bottle can be delivered again, by which a new toner bottle can be delivered to the client location more reliably before a toner-end condition occurs. Further, if the delivered new toner bottle has already reached to the client location, another new toner bottle is not delivered again, by which client can reduce the inventory of toner bottle 60.

In the example embodiment, the toner bottle 60 is attached with the IC chip 61. The IC chip 61 stores a toner identifier (toner ID) to identify the toner bottle 60. The image forming apparatus 10 may read the IC chip 61, which includes information of an installed toner bottle, when a given clock time comes (step S2-1). If the read toner ID and a toner ID stored in the image forming apparatus 10 are not identical (Yes at step S2-2), the control unit 11 conducts a notification process of detecting new toner bottle (step S2-3). With such a configuration, the image forming apparatus 10 can efficiently detect whether a new toner bottle (or spare toner bottle) is set in the image forming apparatus 10 using the toner ID.

In the above described example embodiment, the control unit 11 of the image forming apparatus 10 computes toner consumption amount using the number of printed sheets counted for each type of sheets having different sizes and dot count information. However, the toner consumption amount can be computed by another method. For example, the toner consumption amount can be computed using toner supply amount in toner supply route. In this case, a sensor may be set in the toner supply route to measure toner flow amount, and based on a measurement value of the sensor, toner supply amount (or toner consumption amount) can be computed.

In the above described example embodiment, the control unit 11 of the image forming apparatus 10 conducts a notification of toner remaining amount when toner remaining amount becomes the threshold value for remaining amount or less. Further, the control unit 11 can conduct the notification of toner remaining amount when the expected supply-end date or toner-secured days computed from the toner remaining amount becomes a threshold value or less.

In the above described example embodiment, the image forming apparatus 10 conducts a new supply detection process at a given clock time every day. Instead of such timing set at a given time of each day, the image forming apparatus 10 can conduct a new supply detection process when the toner bottle 60 is replaced with a new toner bottle (or spare toner bottle). Specifically, when the control unit 11 of the image forming apparatus 10 detects a closing of a cover of the image forming apparatus 10, which can be opened and closed when replacing the toner bottle 60, the control unit 11 may read a toner ID stored in the IC chip 61 of the toner bottle 60. Then, the control unit 11 compares the read toner ID and a toner ID stored in the image forming apparatus 10 to determine whether a new toner bottle is installed (step S2-2). If a new toner bottle is installed, the control unit 11 conducts a notification process of detecting new toner bottle (step S2-3).

In the above described example embodiment, when a notification of new toner bottle detection is received, the system controller 21 conducts a data writing process for a new toner information to the new toner information storage 23 (step S3-3). Then, the system controller 21 conducts a search process for the new toner information (step S5-2), and then conducts an information clearing process.

In such process, instead of storing new toner information to the new toner information storage 23, an information clearing process for toner remaining amount information stored in the toner remaining amount information storage 22 can be conducted immediately. In this case, when the system controller 21 of the consumable supply management system 20 receives new toner information (No at step S3-2), the system controller 21 may conduct an information clearing process for toner remaining amount information stored in the toner remaining amount information storage 22 (step S5-4). Specifically, the system controller 21 retrieves apparatus type identifier, apparatus serial number, and toner ID from the received notification of new toner bottle detection. Then, the system controller 21 retrieves the toner remaining amount information 220 having the corresponding apparatus type identifier and apparatus serial number from the toner remaining amount information storage 22. Then, when the system controller 21 confirms that new toner ID in the toner remaining amount information 220 and the toner ID included in the notification of new toner bottle detection are identical, the system controller 21 clears the toner remaining amount information 220 from the toner remaining amount information storage 22. In such information clearing process, toner remaining amount information, which is not necessary anymore, may be deleted to save a storage capacity.

In the above described example embodiment, when an information clearing process is conducted for toner remaining amount information stored in the toner remaining amount information storage 22 (step S5-4), the system controller 21 of the consumable supply management system 20 may clear the corresponding toner remaining amount information 220 from the toner remaining amount information storage 22. For example, in such information clearing process, toner remaining amount information, which is not necessary anymore, may be deleted.

However, instead of deleting the toner remaining amount information 220, a clear flag, indicating that information clearing process is conducted, can be set for the toner remaining amount information 220. In this case, a clear flag information field is set in the toner remaining amount information 220.

Accordingly, in a delivery instruction process, when the system controller 21 determines whether a new toner bottle is already delivered but not yet installed in the image forming apparatus 10 (step S4-1), the system controller 21 does not retrieve the toner remaining amount information 220 storing a clear flag in the clear flag information field. In this case, old data of the toner remaining amount information 220 storing the clear flag may be stored in the toner remaining amount information storage 22, wherein such old data may be used for given purposes.

In the above described example embodiment, a toner bottle is used as an example of consumable supplies, but other consumable supplies such as paper, replaceable parts or the like, which may need to be supplied or replaced at a given timing, can be similarly used as consumable supply for an image forming apparatus according to an example embodiment.

In the above described example embodiment, inventory (or stock) of consumable supplies at a client location can be effectively reduced while consumable supplies can be delivered to the client location at an appropriate timing, wherein such configuration can be devised by the above described consumable supply management system, consumable supply management method, and consumable supply management program.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A communication apparatus to communicate with a counterpart apparatus via a network, comprising:
   a storage unit to store information of the counterpart apparatus;
   a receiving unit to receive given notification information from the counterpart apparatus; and
   a control unit to control information storable in the storage unit,
   wherein when the given notification information received by the receiving unit is first notification information, the control unit stores time information when the first notification information is received in the storage unit,
   wherein when the given notification information received by the receiving unit is second notification information, the control unit stores time information when the second notification information is received in the storage unit, and
   wherein the control unit clears most recent time information stored in the storage unit before storing the time information of any one of the received first and second notification information.

2. The communication apparatus according to claim 1, wherein the control unit stores apparatus identification data in the storage unit when the notification information is received from the counterpart apparatus,
   wherein the control unit periodically retrieves the apparatus identification data stored in the storage unit and clears the apparatus identification data stored in the storage unit.

3. The communication apparatus according to claim 1, wherein the control unit is connected to a client information storage, a delivery system, and a service terminal, the client information storage stores client information and information of the service terminal in connection with apparatus identification data, the delivery system conducts a delivery instruction process of consumable supply, and the delivery instruction unit transmits a delivery request to the delivery system, the delivery request including the apparatus identification data,
   wherein the control unit further comprises a delivery date information recording unit to store an expected delivery date of consumable supply to a management information storage,
   wherein, when the delivery system delivers the consumable supply, an expected delivery date of the consumable supply corresponding to the apparatus identification data is obtained, and the delivery date information recording unit stores the expected delivery date of the consumable supply corresponding to the apparatus identification data, and
   a message communication unit to retrieve management information including the expected delivery date that a present day is behind the expected delivery date, and to send a message communication to the service terminal assigned to the apparatus identification data.

4. The communication apparatus according to claim 1, wherein
   the first notification information is notification that a new toner bottle is detected in the counterpart apparatus and the second notification information is notification of a toner remaining amount in the counterpart apparatus, and
   the receiving unit receives the given notification information that is the first notification information and the given notification information that is the second notification information.

5. A method of managing a communication apparatus that communicates with a counterpart apparatus via a network, the method comprising:
   storing, in a storage unit, information of the counterpart apparatus;
   receiving, at a receiving unit, given notification information from the counterpart apparatus; and
   controlling, at a control unit, information storable in the storage unit,
   wherein when the given notification information received by the receiving unit is first notification information, the control unit stores time information when the first notification information is received in the storage unit,
   wherein when the given notification information received by the receiving unit is second notification information, the control unit stores time information when the second notification information is received in the storage unit, and
   wherein the control unit clears most recent time information stored in the storage unit before storing the time information of any one of the received first and second notification information.

6. The method according to claim 5, wherein
   the first notification information is notification that a new toner bottle is detected in the counterpart apparatus and the second notification information is notification of a toner remaining amount in the counterpart apparatus, and
   in the receiving, the receiving unit receives the given notification information that is the first notification information and the given notification information that is the second notification information.

7. A non-transitory computer readable storage medium having stored thereon a computer program which includes computer-readable instructions that, when executed by a computer, causes the computer to execute a method of managing a communication apparatus that communicates with a counterpart apparatus via a network, the method comprising:
   storing, in a storage unit, information of the counterpart apparatus;
   receiving, at a receiving unit, given notification information from the counterpart apparatus; and
   controlling, at a control unit, information storable in the storage unit,
   wherein when the given notification information received by the receiving unit is first notification information, the control unit stores time information when the first notification information is received in the storage unit,
   wherein when the given notification information received by the receiving unit is second notification information, the control unit stores time information when the second notification information is received in the storage unit, and wherein the control unit clears most recent time information stored in the storage unit before storing the time information of any one of the received first and second notification information.

8. The non-transitory computer readable storage medium according to claim 7, wherein the first notification information is notification that a new toner bottle is detected in the counterpart apparatus and the second notification information is notification of a toner remaining amount in the counterpart apparatus, and in the receiving, the receiving unit receives the given notification information that is the first notification information and the given notification information that is the second notification information.

* * * * *